(12) United States Patent
Florentino (10) Patent No.: US 7,817,383 B2
(45) Date of Patent: Oct. 19, 2010

(54) WINDSCREEN WIPER COMPRISING A PROTECTION DEVICE FOR THE ELECTRIC MOTOR THEREOF

(75) Inventor: Francois Florentino, La Celle Saint Cloud (FR)

(73) Assignee: RENAULT s.a.s, Boulogne Billancourt (FR)

( * ) Notice: Subject to any disclaimer, the term of this patent is extended or adjusted under 35 U.S.C. 154(b) by 587 days.

(21) Appl. No.: 11/813,134

(22) PCT Filed: Dec. 13, 2005

(86) PCT No.: PCT/FR2005/051083

§ 371 (c)(1),
(2), (4) Date: Nov. 15, 2007

(87) PCT Pub. No.: WO2006/072720

PCT Pub. Date: Jul. 13, 2006

(65) Prior Publication Data

US 2008/0111510 A1 May 15, 2008

(30) Foreign Application Priority Data

Dec. 29, 2004 (FR) .................................. 04 14035

(51) Int. Cl.
*H02H 5/04* (2006.01)
*H02H 7/08* (2006.01)
(52) U.S. Cl. ............................. 361/30; 361/18; 361/23; 361/33; 318/434

(58) Field of Classification Search .................... 361/18, 361/23, 30, 33; 318/449
See application file for complete search history.

(56) References Cited

U.S. PATENT DOCUMENTS 5,630,009 A  5/1997  Hayden
5,867,000 A  2/1999  Thornton

FOREIGN PATENT DOCUMENTS

DE     101 57 386     6/2003
EP     0 803 413      10/1997

*Primary Examiner*—Bentsu Ro
*Assistant Examiner*—Erick Glass
(74) *Attorney, Agent, or Firm*—Oblon, Spivak, McClelland, Maier & Neustadt, L.L.P.

(57) ABSTRACT

A windscreen wiper, including a protection device for an electric motor for drive thereof, and corresponding method. The windscreen wiper includes a DC motor with first, second, and third carbon contacts rubbing on a rotor thereof. The first carbon contact is ground, the second is selectively connected to a DC current supply, and the third is connected to neither the ground nor the DC current supply. A sub-assembly for detection of sticking of the electric motor provides information on the sticking of the motor. A voltage measuring device between the first and the third carbon contacts permits taking a first measured voltage value that is compared to a first threshold value to generate further second information on the sticking of the electric motor if the voltage is lower than the first threshold value.

6 Claims, 6 Drawing Sheets

FIG. 1

Prior Art

WINDSCREEN WIPER COMPRISING A PROTECTION DEVICE FOR THE ELECTRIC MOTOR THEREOF

TECHNICAL FIELD

The invention relates to a windshield wiper, particularly for a motor vehicle, this windshield wiper comprising a direct current electric drive motor for driving a windshield wiper mechanism. The motor comprises a rotor, a first, a second and a third carbon brush brushing on its rotor, the first carbon brush being grounded, the second carbon brush being connected selectively to a direct current source by means of a contactor, the third carbon brush being neither grounded nor connected to the direct current source, a subassembly for detecting the sticking of the electric motor in order to deliver an item of information on the sticking of the motor and means for delivering a command signal for the contactor which interrupts the connection with the direct current source.

It also relates to a device for protecting a direct current motor, the motor comprising a first, a second and a third carbon brush brushing on its rotor, the first carbon brush being grounded, the second being connected selectively to a direct current source by means of a contactor for the direct current electric supply, the third carbon brush being neither grounded nor connected to the direct current source.

Finally, the invention relates to a method for protecting a direct current motor of the type described above against destruction by overheating if the motor for driving the windshield wiper mechanism sticks.

A motor vehicle windshield wiper comprises an electric motor for driving a mechanism of the connecting rod/crank type that makes it possible to transform a rotary movement into an alternating movement so as to produce alternating back-and-forth movements of the windshield wiper blades on the windshield of the vehicle in the event of rain. These mechanisms can usually operate in a low speed mode and in a high speed mode in order to adapt to the rain conditions, the difference between the two modes being at least 15 back-and-forth movements per minute. The starting of the windshield wiper may be commanded manually by a contactor, for example situated on the steering wheel, actuated by the driver of the vehicle. The windshield wiper may also be switched on automatically by a rain sensor that commands the operation of the windshield wiper in low speed or high speed mode. When a wiping request is sent, it is transmitted to a logic computing unit that commands power relays in order to cause the motor to operate in low speed mode or in high speed mode, depending on the case.

However, it may happen that the electric motor sticks. In this case, the intensity of the current in the windings of the rotor increases, which leads to a heating that may result in the destruction of the motor. That is why, in order to protect the electric motor if the windshield wiper blades stick, it is normal to provide a protective device.

U.S. Pat. No. 5,630,009 describes a method and a device for commanding a direct current electric motor of a windshield wiper that comprises a heat protection device comprising a bimetallic strip that disconnects the supply of the motor in the case of overheating.

Also known are devices for protecting the electric motor comprising a cam mounted on the motor output shaft. This cam controls the opening and closure of an electric contact so that a rectangular electric signal is generated whose frequency is the same as that of the motor. If the motor sticks, the signal no longer varies. The onboard computer (the arithmetic and logic unit) reacts and disconnects the motor supply. A program managed by the arithmetic and logic unit (on/off test loop) protects the motor from overheating when it sticks and allows it to return to normal operation when the sticking has disappeared.

However, if the detection of the rectangular signal fails, for example if the wire that connects the cam to the arithmetic and logic unit is disconnected, or else if the cam is defective, the arithmetic and logic unit will react in the same manner as if the motor were stuck whereas in reality the latter is rotating normally. As is understood, the result of this is a serious risk if the vehicle is traveling, particularly at high speed, in rain, because the arithmetic unit will interrupt the supply of the electric motor. With the windshield not being wiped, the driver will no longer have visibility, which may result in an accident.

This is why this method of protecting the electric motor against overheating if it sticks is activated only in the following two conditions:

vehicle traveling at less than 7 km/h;
the manual control is switched off before the vehicle reaches 7 km/h.

Except for these two cases, the protective device is not activated. If there is really a sticking, and if this sticking persists during travel, the motor burns out. That is the reason why an additional heat protection is frequently installed, for example a protection by bimetallic strip as described in American U.S. Pat. No. 5,630,009. However, this solution requires the use of an additional component in the electric circuit, hence an increase in cost. Furthermore, it has the effect of increasing the on-line resistance, and hence the energy losses on line.

The subject of the present invention is a windshield wiper and a device for protecting an electric motor that remedy these disadvantages.

With respect to the windshield wiper, these aims are achieved by the fact that it comprises means for measuring the voltage between the first and the third carbon brushes in order to obtain a first measured voltage value; a comparator for comparing the first measured voltage with a first threshold value in order to generate a second item of information on the sticking of the electric motor if the comparison has determined that the first measured voltage is less than the first threshold value.

The second item of information on the sticking of the electric motor forms an item of redundant information as a control of the information supplied by the subassembly for detecting the sticking of the electric motor.

Advantageously, the windshield wiper or the device for protecting the motor may also comprise means for measuring the voltage between the first and the second carbon brushes in order to obtain a second measured value supplied to the comparator and in order to compare this second measured voltage value with a second threshold value.

This second measured value may be another item of redundant information making it possible to confirm that the motor is sticking.

According to the method, in a first step, with the electric motor of the windshield wiper operating normally, on the one hand, the voltage between the first and the second carbon brush is measured in order to obtain a first threshold value and, on the other hand, the voltage between the first and the third carbon brushes is measured in order to obtain a second threshold value.

These values having been measured and recorded in a memory register of the arithmetic and logic unit of the vehicle, during the normal operation of the windshield wiper, on the one hand, the voltage between the first carbon brush and the second carbon brush is measured and the measured value is compared with the first threshold value. On the other hand, and optionally, the voltage between the first carbon brush and the third carbon brush is measured and the value thus measured is compared with the second threshold value. The electric supply of the motor is interrupted if the comparison has determined that the first measured value is less than the first threshold value and/or that the second measured value is less than the second threshold value.

Yet other features and advantages of the invention will appear on reading the following description of exemplary embodiments given as an illustration with reference to the appended figures. In these figures.

Figure 1:
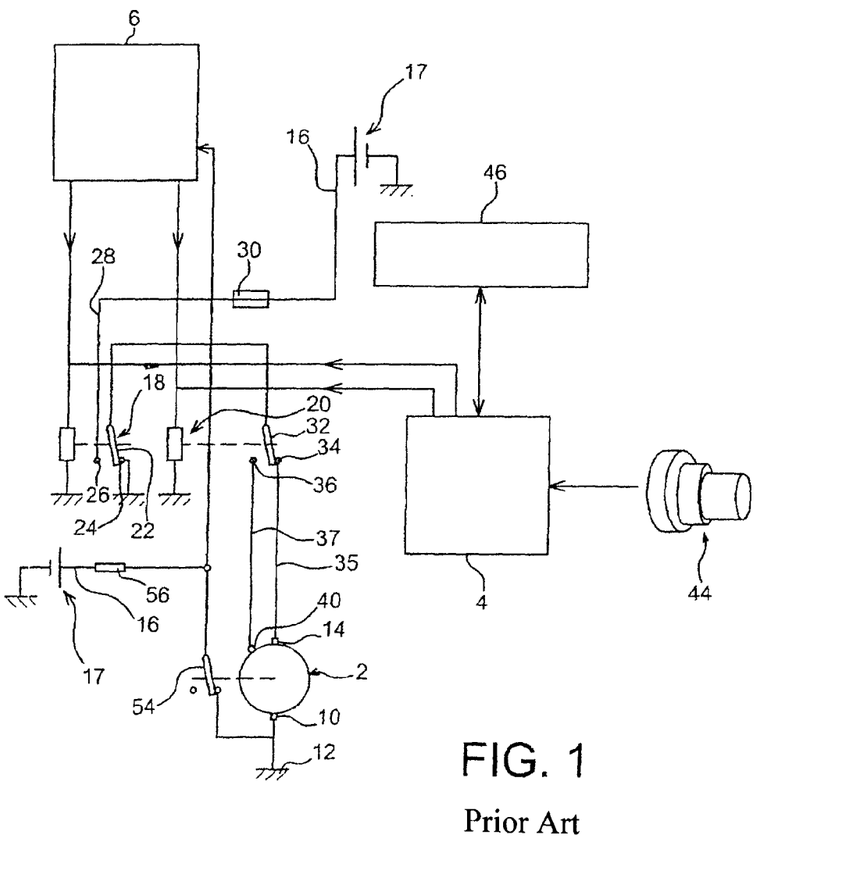
FIG. 1 represents an overview of a windshield wiper assembly of the conventional type.

The windshield wiper assembly represented in FIG. 1 comprises an electric motor 2, a first arithmetic and logic unit 4, called the passenger compartment control unit (UCH) and a second arithmetic and logic unit 6, called the motor slave unit (USM).

The motor 2 is a direct current motor. In a conventional manner it comprises a fixed portion, the stator, and a rotating portion, the rotor. The stator consists of permanent magnets that generate a magnetic field Φ. The rotor is an elongated circular metal part. It comprises a number of notches in which electric conductor wires forming turns are wound. The electric motor 2 is a motor with two rotation speeds. It may operate at a first rotation speed, called "low speed" and at a second rotation speed, higher than the first, called "high speed". Only the rotor is electrically supplied. Accordingly, a first carbon brush or brush 10, constituting a brushing contact, is connected by electric connections 12 to a terminal of the electric current source, the negative terminal in the present case forming the ground. A second carbon brush 14 is connected selectively to the other terminal 16 of the electric current source 17, for example the accumulator battery of the vehicle. A low speed relay 18 and a high speed relay 20 are interposed between the positive terminal 16 and the second carbon brush 14. An armature 22 of the low speed relay 18 is in contact either with a terminal 24 that is grounded, or with a terminal 26 that is connected by means of an electric conductor 28 to the terminal 16. A protective fuse 30 is optionally placed in series on the conductor 28. An armature 32 of the high speed relay 20 is in contact either with a terminal 34 connected via a conductor 35 to the second carbon brush 14, or with a terminal 36 connected via a conductor 37 to a third carbon brush 40. In this example, the low speed relay 18 and the high speed relay 20 are placed in series. When the armature 22 of the low speed relay is connected to ground, the relay is in the "off" position. On the other hand, when the armature 22 is in contact with the terminal 26, the relay 18 is in the "on" position. In the same manner when the armature 32 of the high speed relay 20 is in contact with the terminal 34, the relay is in the "off" position and when the armature 32 is in contact with the terminal 36, the relay 20 is in the "on" position. In order for the direct current electric motor 2 to be supplied at low speed, it is necessary for the low speed relay 18 to be in the "on" position and for the high speed relay 20 to be in the "off" position. For the motor 2 to be supplied at high speed, it is necessary for the relays 18 and 20 both to be in the "on" position.

The passenger compartment control unit 4 is connected to a control switch 44, placed for example beneath the steering wheel. The switch 44 has four positions: an "off" position, a low speed "on" position, a high speed "on" position and an automatic position. When the switch is in the automatic position, the switching on and the switching off of the windshield wiper blades are commanded by a rain sensor 46 connected to the passenger compartment control unit 4. The unit 4 is connected via electric conductors to the coils of the low speed relay 18 and high speed relay 20 in order to control the armatures of each of these relays and, consequently, the switching on and off of the windshield wiper blades. The motor slave unit 6 is also capable, as will be explained later, of commanding the relays 18 and 20.

It may happen that the electric motor sticks, for example, because the windshield wiper blades encounter an obstacle on the windshield. In this case, the intensity of the current traveling through the coils of the winding channels of the rotor increases, which leads to its overheating and possibly its destruction.

Figure 4:
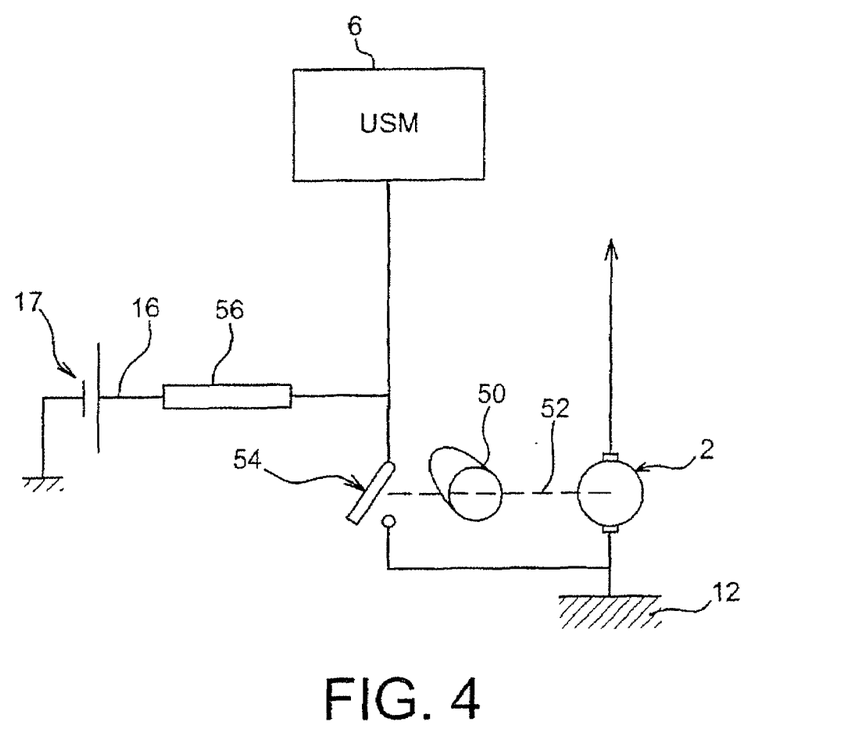
FIG. 4 is a detail view of the windshield wiper assembly represented in FIG. 1 showing a subassembly for protecting the motor using a cam mounted on the shaft of the latter.
Figure 5:
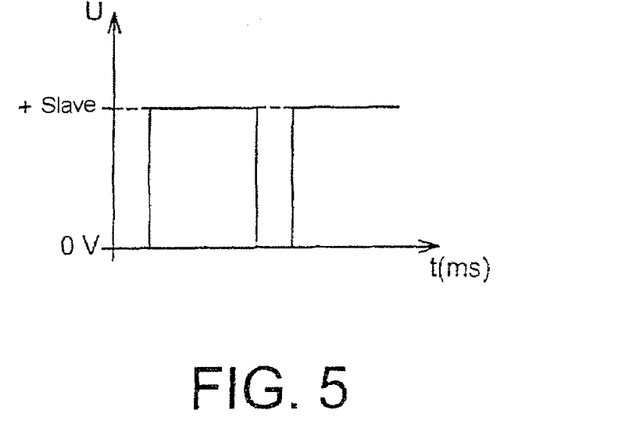
FIG. 5 is a curve that represents the voltage of the cam signal over time.

In order to prevent this, the windshield wiper assembly of FIG. 1 is fitted with a subassembly for detecting the sticking of the motor. In a known manner, this subassembly, represented in detail in FIG. 4, comprises a cam 50 that is mounted on the shaft 52 of the rotor of the electric motor. The cam 50 commands the opening and closure of an electric contact 54 connected to one of its terminals, to ground 12 and to its other terminal at the positive pole of the accumulator battery 17 via a set of electronic components 56 allowing the filtering and regulation at the terminals of the switch 54 that is also connected to the motor slave unit 6. In this manner, this subassembly generates a rectangular-shaped voltage having the same frequency as the rotation of the motor. This voltage is represented in FIG. 5. When the contact 54 is closed, the voltage is equal to 0. When the contact is open, the voltage U perceived by the unit 6 is substantially equal to the voltage of the accumulator battery 17.

If the motor sticks, the voltage U no longer varies.

It is permanently equal to 0 or to the slave voltage (the voltage of the accumulator battery 17), depending on the position in which the motor is stuck. When the unit 6 detects this situation, it commands the low speed relay 18 in order to make it switch to its "off" position that interrupts the supply of the electric motor. A program managed by the motor slave unit 6 ("on/off" test loop) protects the motor from overheating during the sticking and allows it to operate normally when the sticking disappears.

However, it may happen that the subassembly for detecting the sticking of the motor supplies an incorrect indication because the wire that connects it to the arithmetic and logic unit 6 is disconnected or else because the cam is defective (worn). In this case, the unit 6 will interpret the absence of variation of the signal as a sticking of the electric motor 2 and will interrupt its supply. If the vehicle is traveling at a high speed in heavy rain, the result of this will be a sudden loss of visibility and consequently a serious risk of an accident. This is why, to ensure the safety of operation of the windshield wiper, the device for detecting sticking is activated only in the following conditions:

the vehicle is traveling at a speed of less than 7 km/h;

the manual control switch 44 of the windshield wiper has been placed by the driver of the vehicle in the "off" position before a speed greater than 7 km/h.

Except for these cases, the device for detecting the sticking of the motor will not disconnect the supply of the latter. Consequently, if the detection made corresponds to an actual sticking, the motor will burn out.

It is known practice to remedy this disadvantage by installing an additional heat protection, for example a circuit-breaker comprising a bimetallic element, that will interrupt the supply of electric current to the motor if its temperature rises. However, the use of this heat protection has a cost. Also, it increases the on-line electric losses.

Figure 6:
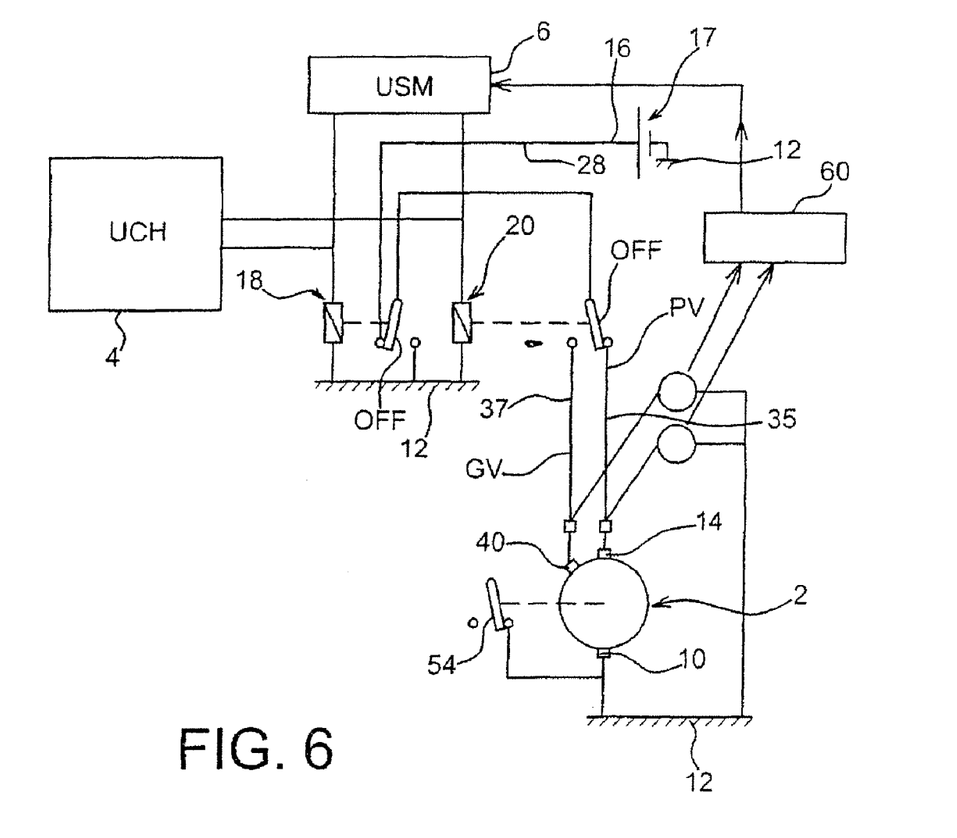
FIG. 6 is an overview of a windshield wiper assembly according to the present invention.

FIG. 6 shows a windshield wiper assembly according to the present invention that remedies the disadvantages listed above. It is generally similar to the windshield wiper assembly that has been described with reference to FIGS. 1 to 4. In the same manner, it comprises a direct current electric motor 2, a passenger compartment control unit 4, a motor slave unit 6, a direct current source 17, a low speed relay 18 and a high speed relay 20. Three brushes or carbon brushes 10, 14, 40 are in brushing contact with the electric conductors wound on the rotor of the motor 2. The operation of the device is identical. Consequently, its description will not be repeated.

According to the invention, the windshield wiper comprises means for measuring the voltage between the first carbon brush 10 and the third carbon brush 40 in order to obtain a first measured voltage value. In the example shown, these means consist in a recorder 60 capable of measuring and recording the voltage between the carbon brushes 10 and 40. The recorder 60 supplies the measured voltage to the motor slave unit 6. In this unit, the first measured voltage value is compared with a first threshold value in order to generate an item of information on the sticking of the electric motor 2, if the comparison has determined that the first measured voltage is less than the first threshold value. As explained above, the item of information on the sticking of the motor 2 acts so as to interrupt the electric current supply of the motor 2.

This system can operate in isolation. Or else, preferably, it can operate in parallel with a conventional device for detecting the sticking of the motor, such as the system with a cam and switch described with reference to FIGS. 4 and 5. In this case, the item of information on the sticking of the electric motor 2 that results from comparing the first measured voltage value with a threshold value constitutes a second item of information on the sticking of the electric motor that confirms or invalidates the first item of information on the sticking of the electric motor delivered by the system with a cam and switch. In this way there is an item of redundant information that increases the reliability of detection. If the motor sticks, the sticking information supplied by the cam is confirmed by the measured voltage level. In degraded mode, that is to say in the event of a false detection by the cam of sticking of the motor due, as explained above, to a disconnection of the wire connecting to the motor slave unit 6 or due to wearing of the cam, the level of the first measured voltage makes it possible to detect the false indication and consequently that there is no sticking of the motor. Consequently, in such a situation, the supply of the motor is not interrupted. In this mode of operation, the sticking detection system using the measurement of the voltage takes priority over the item of information supplied by the cam.

This system has the advantage of dispensing with a heat protection component, for example a circuit-breaker, in the electric circuit supplying the motor 2. The on-line resistance is reduced. Also, safety of operation is increased thanks to the redundancy of information.

In FIG. 6, the windshield wiper assembly has been shown in the low speed operating mode. In this mode, the relay 18 is in the "on" position whereas the relay 20 is in the "off" position. The carbon brush 14 is thus connected to the direct current source 17 while the third carbon brush 40 is not supplied.

The device for detecting the sticking of the motor that has just been described also applies when the windshield wiper operates in high speed mode. In this case, each of the two relays 18 and 20 is in the "on" position so that the third carbon brush 40 is connected to the direct current source 17 and the second carbon brush 14 is not supplied. In this case, the roles of the carbon brushes 14 and 40 are inverted. Instead of measuring the voltage between the carbon brush 10 and the carbon brush 40, the voltage between the carbon brush 10 and the carbon brush 14 is measured. This voltage is compared with a second threshold value, different from the first, in order to generate an item of information on sticking of the electric motor, in the same manner as above.

Figure 2:
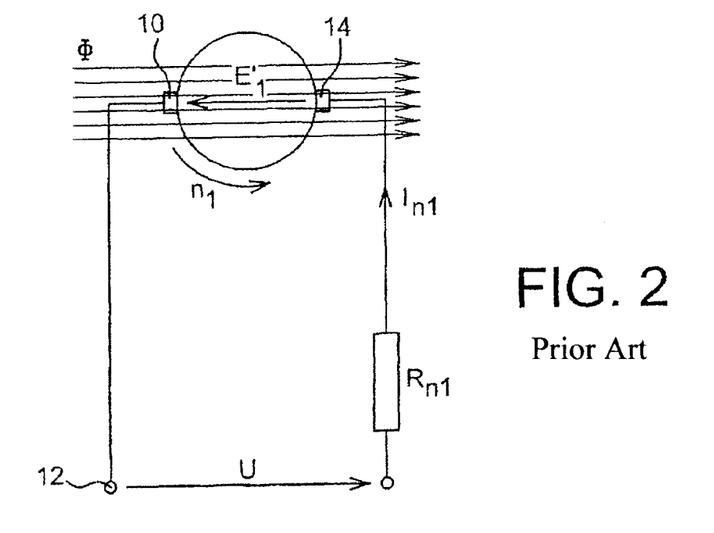
FIGS. 2 and 3 are wiring diagrams respectively of the operation in low speed mode and in high speed mode of the electric motor of the windshield wiper assembly of FIG. 1.

In low speed mode as represented in FIG. 2, it is the carbon brush 14, diametrically opposed to the first carbon brush 10, that is connected to the electric current source. For a direct current motor with constant excitation or flux such as the electric motor 2, the basic formulas are:

$$E' = \frac{P}{\alpha} \times N \times n \times \Phi \text{ and } E'' = U - R \times I.$$

In these formulas, U is the supply voltage of the rotor, R is the resistance of the rotor windings, n is the speed of rotation of the rotor in radians per second, $\Phi$ is the average flux under a pole, p is the number of pairs of poles, a is the number of pairs of winding channels and N is the number of active conductors per winding channel. The active conductors form the portion of the winding that is in contact with the carbon brushes 10 and 14. The values a and p being constant (K=p/a), the speed of rotation of the motor is expressed by the following formula:

$$n = \frac{U - R \times I}{k \times N \times \Phi}$$

Figure 3:
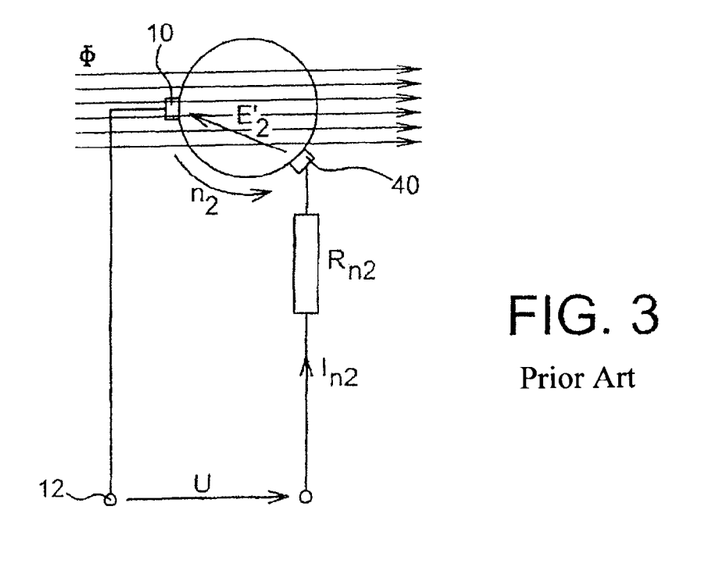

When the position of a supply carbon brush is moved, as shown in FIG. 3 (carbon brush 40), the resistance R reduces because the winding of the rotor is no longer supplied symmetrically. The current increases proportionally because the product R×I is constant. The active conductors moved relative to the main flux are subjected to a lesser flux. The product N×Φ diminishes so that the speed of rotation of the motor increases. Consequently, the speed of rotation of the motor n1 (FIG. 2) is less than the speed of rotation n2 (FIG. 3).

Figure 7:
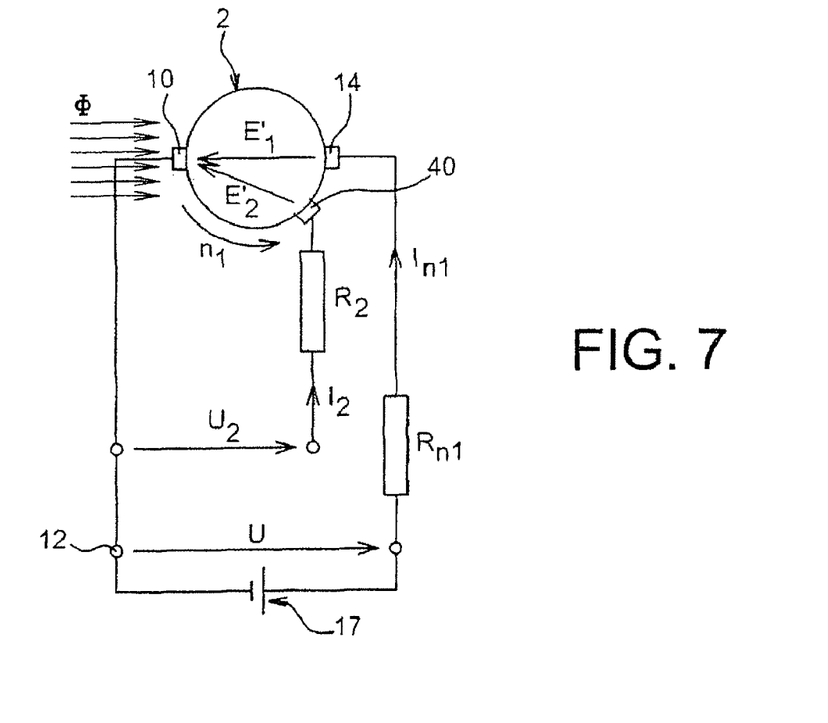
FIG. 7 is a wiring diagram that illustrates the electromotive force induced in the high speed circuit when the motor operates in low speed mode.

FIG. 7 shows the principle of the measurement of the first voltage. In this figure, the motor 2 is supplied at low speed. The carbon brush 14 is connected to the direct current source 17. The supply voltage U causes the motor to rotate at the speed n1. The formulas explained previously with reference to FIG. 3 apply. On the other hand, the circuit that is not supplied behaves like a generator. Between the carbon brush 10 and the carbon brush 40, there appears a voltage $U_2=E'_2-(R_2 \times I_2)$. Given that this circuit is open, $I_2=0$. Consequently, $U_2=E'_2=K \times N_2 \times \Phi_2 \times n1$.

$$\frac{U}{U_2} = \frac{E'_1 + (R_{n1} \times I_{n1})}{E'_2 + (R_2 \times I_2)} = \frac{N \times \Phi \times n_1 + (R_{n1} \times I_{n1})}{N_2 \times \Phi_2 \times n_1 + (R_2 \times I_2)}$$

$(N \times \Phi) > (N_2 \times \Phi_2)$ and $(R_{n1} \times I_{n1}) > (R_2 \times I_2) \Rightarrow U > U_2$.

Figure 8:
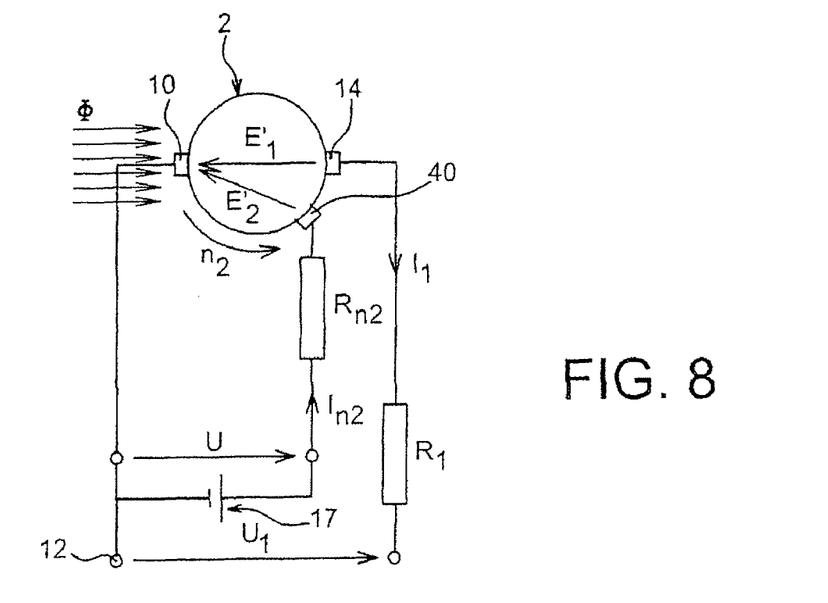
FIG. 8 is a wiring diagram that illustrates the voltage induced in the low speed circuit when the motor operates in high speed mode.

In FIG. 8, the electric motor 2 is supplied in high speed mode. The third carbon brush 40 is connected to the direct current source 17 at a voltage U which causes the motor to rotate at the speed n2. The circuit that is not supplied, namely in this case the low speed circuit, behaves like a generator. On the carbon brush 14 there appears a voltage $U_1=E'_1=k \times N1 \times \Phi1 \times n_2$.

$$\frac{U}{U_1} = \frac{E'2 + (R2 \times I2)}{E'_1 + (R_1 \times I_1)} = \frac{N_2 \times \Phi_2 \times n_2 + (R_2 \times I_2)}{N \times \Phi \times n_2 + (R_1 \times I_1)}$$

$(N \times \Phi) > (N_2 \times \Phi_2)$ and $(R_{n1} \times I_{n1}) > (R_1 \times I_1) \Rightarrow U_1 > U$.

Figure 9:
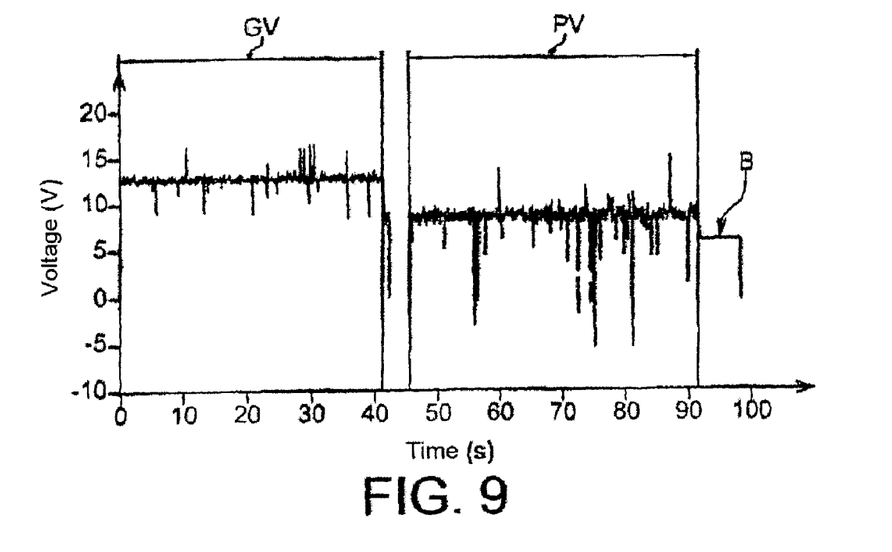
FIG. 9 is a readout of the voltage in the high speed circuit, in operation respectively in high speed mode and in low speed mode.

FIG. 9 represents the voltage readout in the high speed circuit, respectively in high speed mode (left portion of FIG. 9) and in low speed mode (central portion of FIG. 9).

For a voltage of the direct current source 17 of 13.85 volts, the average voltage in the high speed circuit in high speed mode is substantially 12.62 volts. This voltage is variable between +9 volts and +16 volts approximately.

On the other hand, the voltage in the low speed circuit is on average 8.33 volts. This voltage is a voltage induced by the rotation of the electric motor, the low speed circuit behaving like a generator. This voltage is the first measured value corresponding to the case of FIG. 7 when the motor rotates normally. Consequently, the first threshold value is therefore 8.33 volts for a supply voltage of 13.85 volts. Naturally, if the supply voltage varies, the threshold value will also change.

Finally, the right portion of FIG. 9 (zone B) shows the voltage in the high speed circuit in the event of sticking of the motor. As can be seen, this voltage is stable, unlike the two previous cases. Its value is approximately 6 volts. It can be seen consequently that it is less than the first threshold value of 8.33 volts, which characterizes a situation of sticking of the electric motor.

Figure 10:
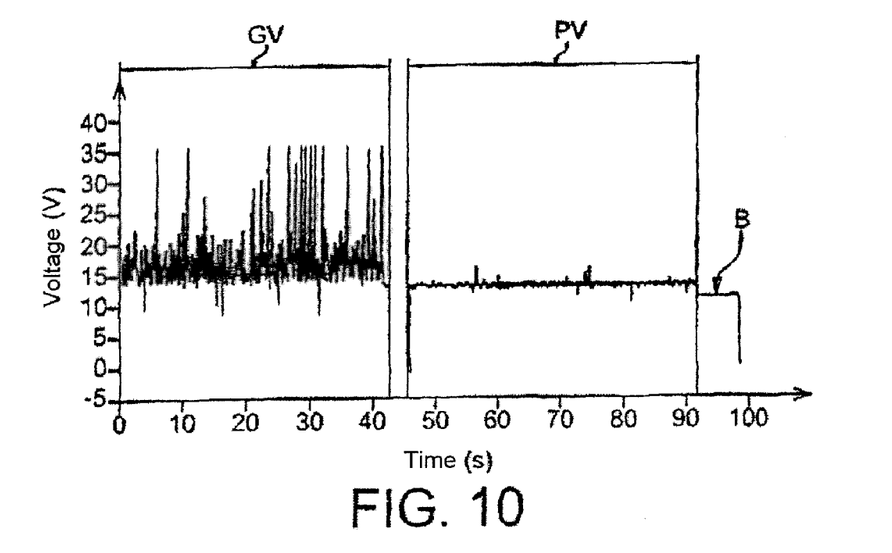
FIG. 10 is a readout of the voltage in the low speed circuit, in operation respectively in high speed mode and in operation in low speed mode.

FIG. 10 represents the readout of the voltage in the low speed circuit respectively in high speed mode (left portion of FIG. 10) and in low speed mode (central portion of FIG. 10).

For a supply voltage of 13.85 volts of the current source 17, the average voltage in high speed mode in the low speed circuit is 17.22 volts. This voltage is an induced voltage, as explained with reference to FIG. 8 described above. It is found that this voltage is extremely variable since it varies substantially between +10 volts and +35 volts. In addition, as can be seen, its level is higher than the voltage induced in the high speed circuit in the low speed operating mode. This is explained by the fact that the rotation speed of the motor is higher. Consequently, the electromotive force generated by the generator is greater. It even exceeds the supply voltage of 13.85 volts. The average voltage of 17.22 volts is consequently a first threshold value in high speed operating mode.

The central portion of FIG. 10 represents the voltage in the low speed circuit for the low speed mode. This voltage is on average 12.96 volts, still for a supply voltage of 13.85 volts. It is variable, but its variations are not very great (+10 volts to +15 volts). Finally, the right portion of FIG. 10 (zone B) shows the readout of the voltage in the low speed circuit in the case of sticking of the motor. This voltage is approximately 12 volts. It can be seen that it is less than the threshold value defined for the high speed operating mode, namely 17.22 volts as explained above. The detection of this voltage by the motor slave unit 6 will therefore trigger the interruption of the supply of the electric motor.

Additionally, it is possible to compare, according to the invention, not only the value of the voltage but also its variability since it is noted that the induced voltages, whether in the low speed circuit or in the high speed circuit, vary greatly whereas, on the contrary, in the case of sticking of the motor, the voltage readout in these same circuits is strictly constant.

The invention claimed is:

1. A windshield wiper, comprising:
    a direct current electric motor for driving a windshield wiper mechanism, the motor including a rotor, a first, a second, and a third carbon brush brushing on its rotor, the first carbon brush being grounded, the second carbon brush being connected selectively to a direct current source by a contactor, the third carbon brush being connected selectively to the direct current source;
    a first subassembly that detects sticking of the electric motor to deliver an item of information on the sticking of the motor;
    means for delivering a command signal to a contactor that interrupts connection of the motor with the direct current source;
    means for measuring a voltage between the first and the third carbon brushes to obtain a first measured voltage value; and
    a comparator that compares the first measured voltage with a first threshold value to generate a second item of information on the sticking of the electric motor if the comparison has determined that the first measured voltage is less than the first threshold value.

2. The windshield wiper as claimed in claim 1, further comprising a second subassembly that detects sticking of the motor to deliver a second item of information on the sticking of the motor, and wherein the second item of information on the sticking of the motor forms an item of redundant information as a control of the information supplied by the first subassembly that detects the sticking of the electric motor.

3. The windshield wiper as claimed in claim 1, further comprising means for measuring a voltage between the first and the second carbon brushes to obtain a second measured value supplied to the comparator, and for comparing the second measured voltage value with a second threshold value.

4. The windshield wiper as claimed in claim 3, wherein the comparator delivers a command signal that interrupts the connection of the electric motor with the direct current source if the comparison has determined that the first measured value is less than a first threshold value and/or that the second measured value is less than a second threshold value.

5. The windshield wiper as claimed in claim 1, further comprising at least one logic computing unit into which a decision algorithm is inserted, the item of information on sticking delivered by the motor sticking detection subassembly, and the item of information on sticking delivered by the comparator being fed into the logic computing unit to deliver or not a command signal that interrupts the supply of the motor.

6. The windshield wiper as claimed in claim 1, wherein the motor sticking detection subassembly comprises a cam that is mounted on the motor shaft and that commands opening and closure of a contact to generate a signal of a same frequency as rotation of the motor.

* * * * *